(No Model.)
A. BALL.
TRIPOD FOR ROCK DRILLS.
No. 471,300. Patented Mar. 22, 1892.
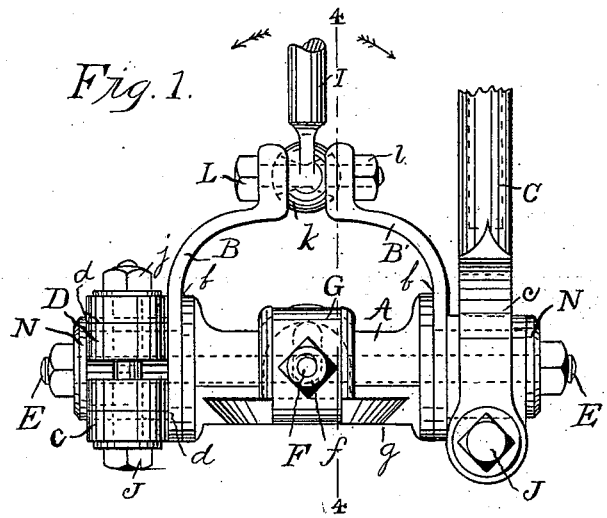
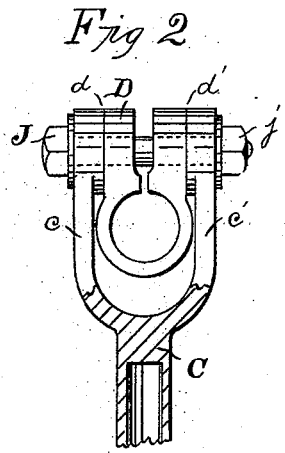
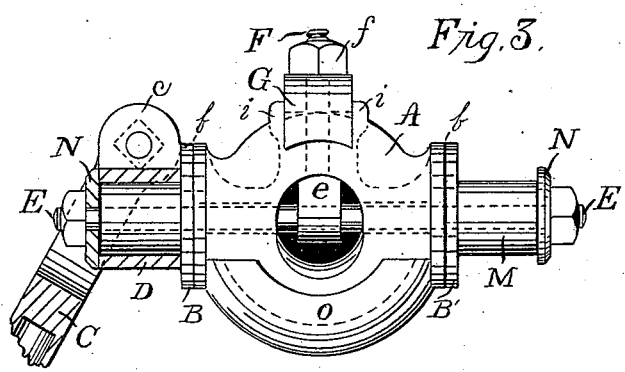
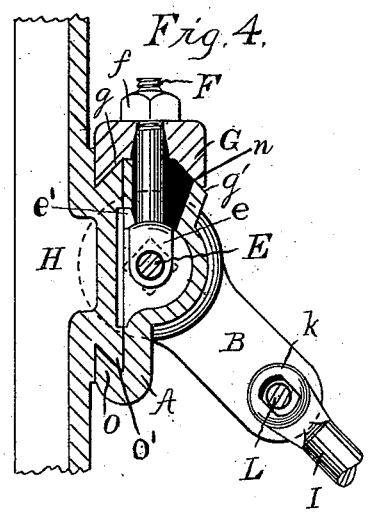
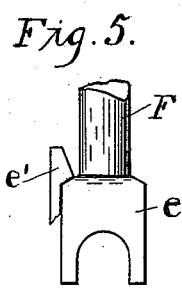
WITNESSES:
Arch. M. Catlin.
Edward House
INVENTOR:
Albert Ball
by
Benj. R. Catlin
atty.

UNITED STATES PATENT OFFICE.

ALBERT BALL, OF CLAREMONT, NEW HAMPSHIRE, ASSIGNOR TO THE SULLIVAN MACHINE COMPANY, OF SAME PLACE.

TRIPOD FOR ROCK-DRILLS.

SPECIFICATION forming part of Letters Patent No. 471,300, dated March 22, 1892.

Application filed July 9, 1891. Serial No. 398,909. (No model.)

*To all whom it may concern:*

Be it known that I, ALBERT BALL, a resident of Claremont, in the county of Sullivan and State of New Hampshire, have invented certain new and useful Improvements in Tripods for Rock-Drills; and I do hereby declare the following to be a full, clear, and exact description of the invention, such as will enable others skilled in the art to which it pertains to make and use the same.

The invention will first be described in connection with the accompanying drawings, and then pointed out in the claims.

Figure 1 of the drawings is a plan of a tripod, two of the legs being represented as partly broken away and the other as concealed below its attaching devices. Fig. 2 is an elevation, partly in section, of said devices. Fig. 3 is a side elevation, one of the side legs being removed and the other partly broken away. Fig. 4 is a vertical section of the swiveling head and of a portion of the rock-drill frame secured thereto on line 4 4 of Fig. 1, an arm being omitted; and Fig. 5 is a partial elevation of a detail.

A represents the head of the tripod, to which the legs are so connected as to have various adjustments.

B B indicate arms provided with trunnions M.

E is a bolt passing centrally through said trunnions and the head adapted to hold them together in the manner shown. These arms support the rear leg I, which has a round head $k$, fitted in similarly-shaped recesses in the ends of the arms, the several parts being connected by the bolt L, having nut $l$. In the head of the leg is an opening, shaped like a flattened hour-glass, through which bolt L passes, the purpose of this special form of opening being to permit the leg I to swing in the plane of the bolt laterally, but to prevent its movement in planes oblique to the bolt. The leg turns freely about the bolt in the transverse plane at right angles to that first named. By tightening the nut upon the bolt the arms B are pressed upon the head and hold it in any chosen position. The side walls of the flattened opening bear on the bolt and prevent movement in any intermediate or oblique plane, as stated. This contributes to certainty and accuracy of adjustment. The above tightening of the bolt also binds the arms B upon the shoulders $b$ of the head A. This form of securing device can also be used for the side legs.

The side legs C are forked, as shown at $c$ $c'$, and D indicates a clamping-block located between the limbs or arms of the fork and adapted to embrace a trunnion on an arm B or B'. The bolt J, provided with nut $j'$, passes through openings in the arms and block and through washers N N, as clearly shown, and by tightening this bolt by screwing up the nut the clamp can be fastened upon the trunnion M and the leg also secured in position by the same means, the arms and the block being pressed together at $d\ d'$. When not thus fastened by the screwing up of nut $j$, the block D turns freely on the trunnion in a plane transverse to the head. When these parts are loose, the leg C can also be turned about the bolt J in a plane transverse to that first named. It may be noted that the point of suspension of the tripod-head is above itself and not below, as in prior constructions of the same general character, whereby the improved construction has greater range of adjustment and also greater stability, and also that the leg cannot be moved inwardly toward the drill to a distance fatal to the equilibrium of the tripod, because it will be arrested by the contact of the arms $c\ c'$ with an arm B or B'.

The head of the tripod is attached to the drill-frame H by means of an undercut or dovetail-shaped projection O', which is embraced by a correspondingly-shaped jaw O on the head and detachable jaw G, which latter is so shaped and arranged that it can be made to embrace the projection O' at $g$ and the head A at $g'$, and can be forced down thereupon by the bolt F and its nut $f$. This bolt F is upset at its foot and formed into a head or fork $e$, that loosely embraces either wholly or partially the bolt E. (See Fig. 3.) It has a bearing $e'$ upon the casting above the bolt, which casting receives the strain or thrust of the bolt when its nut is screwed down. Such operation forces or draws the head and frame toward each other and fastens them solidly. To separate the head and frame, it is only necessary to turn back the nut a short distance, whereupon the bolt F and jaw G can be swung aside and the head removed. At such times the bolt, nut, and detachable jaw remain attached to each other and to the head near an operative position and in readiness for use, thus avoiding the inconvenience resulting from the entire detachment of the parts from each other. The head is recessed at $n$ to permit the bolt to be moved sidewise or about bolt E, as described.

Having thus described my invention, what I desire to secure by Letters Patent is—

1. In a tripod for rock-drills, the rear leg provided with a spherical head, the arms having similarly-shaped recesses to receive the head and having attached thereto the trunnions M, provided each with a shoulder, and the bolt and nut to fasten the arms upon the head, in combination with the tripod-head having similar shoulders $b$ and with the side legs and securing-bolt E, said bolt being adapted to hold the shoulders in contact and also to hold the arms upon the spherical head, substantially as set forth.

2. The combination of a drill-frame provided with an undercut projection, a tripod-head having a fixed jaw O and an inclined face $g'$, a detachable clamp having faces adapted to embrace the said inclined face of the head and also the undercut face of the frame projection, a screw-bolt F to force the parts together, and the bolt E, said screw-bolt having a pivotal connection with the bolt F and a bearing $e'$ to receive its strain, substantially as set forth.

3. In a tripod for rock-drills, the combination of the head, the rear leg, the arms B B', bearing both on the head of the tripod and on said leg, the side legs having arms $c\ c'$, the clamping-block D, located between said arms and embracing trunnions fast on arms B B', the bolt E, adapted to fasten the arms and side legs on the tripod-head, and the fastening-bolt J, provided with nut $j$, whereby the head is suspended in the arms $c\ c'$, substantially as set forth.

In testimony whereof I have signed this specification in the presence of two subscribing witnesses.

ALBERT BALL.

Witnesses:
 FRANK A. BALL,
 GEO. O. BALL.